United States Patent [19]

Hudson

[11] Patent Number: 4,538,694
[45] Date of Patent: Sep. 3, 1985

[54] CONTACTING MEANS FOR GUIDING CONTAINERS ACROSS WEIGHT PLATFORM

[75] Inventor: James A. Hudson, Westville, N.J.

[73] Assignee: Campbell Soup Company, Camden, N.J.

[21] Appl. No.: 557,120

[22] Filed: Dec. 1, 1983

[51] Int. Cl.³ .................... G01G 13/00; G01G 19/00
[52] U.S. Cl. ..................................... 177/145; 177/52; 198/504
[58] Field of Search .................................. 177/52-54, 177/145; 198/504; 209/592

[56] References Cited

U.S. PATENT DOCUMENTS 1,986,069  1/1935  Richard .................................. 177/52
3,416,619  12/1968  McClusky .............................. 177/53
4,344,493  8/1982  Salmonsen et al. .................... 177/52

Primary Examiner—E. A. Goldberg
Assistant Examiner—Patrick W. Foster
Attorney, Agent, or Firm—Albert L. Free

[57] ABSTRACT

Food cans are slid across a vertically-oscillating weigh platform while being guided by contacting means bearing against their upstream side surfaces. The contacting means comprise a pair of rollers rotatable about an axis transverse to the direction of sliding motion of the cans, and bearing against the vertical side surfaces of the cans above the bottom bead of the can. This avoids the indentations formed in the lug contactors of the prior art after many contacts with the bead of the can, and thereby improves the weighing accuracy.

6 Claims, 2 Drawing Figures

U.S. Patent  Sep. 3, 1985  4,538,694
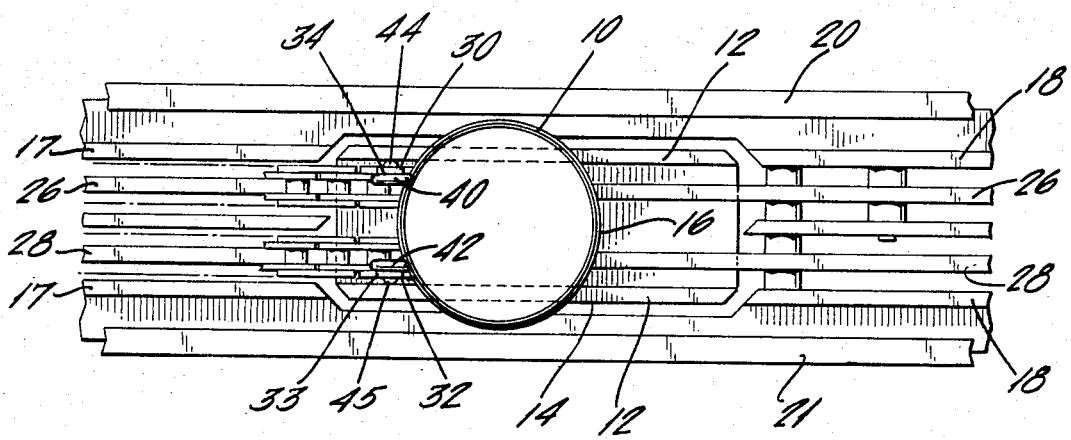
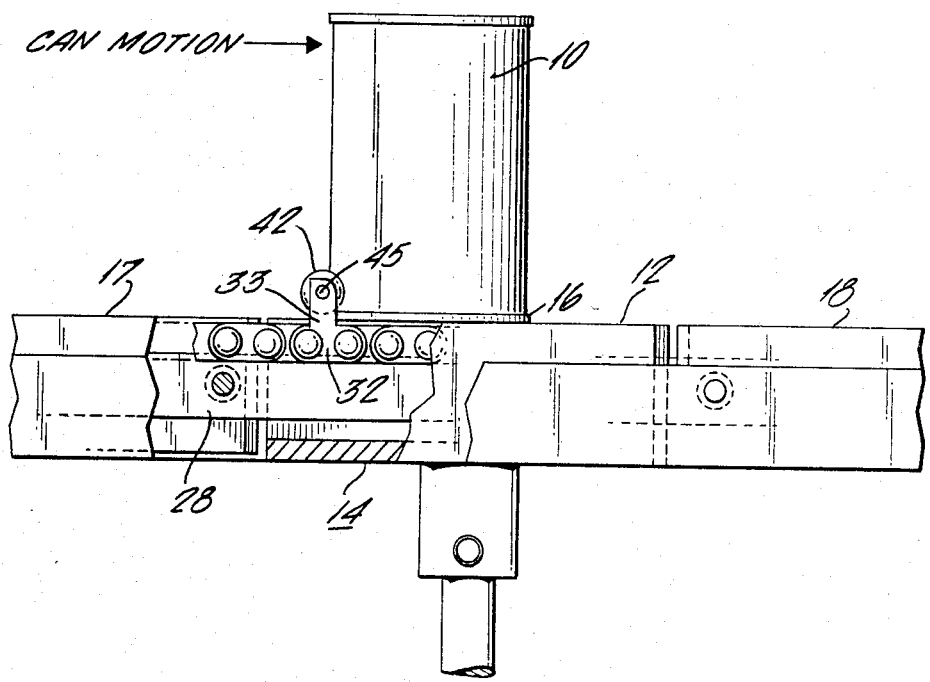

CONTACTING MEANS FOR GUIDING CONTAINERS ACROSS WEIGHT PLATFORM

BACKGROUND OF THE INVENTION

This invention relates to improved means for contacting a container as it is slid across the top of a weight platform so as to maintain its position in indexed relation to other portions of the system. More particularly, in the system of U.S. Pat. No. 4,344,493 of Andrew R. Salmonsen, filed Mar. 6, 1981 and issued Aug. 17, 1982 there is described and claimed a high-speed weighing and conveying apparatus in which open-topped cans are filled at a filler station and moved slidingly in a train along a rail system and across a weigh platform to a closer. In such system it is required that the cans be filled, weighed and closure initiated at particular times with reference to the operations of the filler, weigher and closer, and in relation to the same operations for other cans in the train. This is accomplished in this example by means of an endless-chain arrangement which moves, below the level of the top of the weigh platform, from a position ahead of the weigh platform to a position downstream of the weigh platform, and which has on it a series of spaced-apart upstanding lugs each of which extends upwardly above the top of the weigh platform so as to contact the upstream edge of the bead at the bottom of each can and to maintain a guiding contact with the bead as the can slides over the weigh platform. During the time period in which the can is sliding over the platform, the can is intended to be substantially free with respect to its up and down motion, so that the corresponding up and down motion of the weigh platform properly represents the weight of the can and contents and an accurate weight indication is produced.

It has been found that this method of conveying the cans across the weigh platform has an adverse effect upon the accuracy of weighing after the apparatus has been used for an extended period of time. This has been found to be due to the fact that the can beads, which have a relatively small radius of curvature in radial planes and extend radially outward from the main body of the can, eventually tend to wear an indentation into the leading or contacting edges of the lugs. This indentation tends to support some of the can weight as the can moves across the weigh platform, thus resulting in some error in weight indication; in addition, this indentation tends to restrict vertical movement of the cans while they are are on the weigh platform, so that they do not move in exact natural vertical oscillation with the platform, due to the fact that the cans are to some extent seated in the indentations.

Such resultant errors in the indications of weight of container and contents require that the can be filled higher than necessary, in order to assure that the can will be adequately filled; if a more exact weight indication can be obtained, then the amount of product placed in the can can be restricted more exactly to the required minimum amount, and a considerable saving in the amount of product dispensed thereby realized over a substantial period of operation.

It is therefore an object of the invention to provide new and useful contacting means for contacting the upstream side of a container as it is slid over a weigh platform.

Another object is to provide such apparatus which permits the weight of the container to be fully supported by the weigh platform and to move freely up and down along with the weigh platform, even after very long periods of repetitious use of the contacting means.

A further object is to provide such an improved contacting means which results in more accurate weight indications.

SUMMARY OF THE INVENTION

These and other objects and features of the invention may be realized by the provision of apparatus comprising container contacting means which does not contact the small flange-like bottom portion of the container, commonly designated as the bead of the can, but instead contacts the main side surface of the upstream side of the container above the flange-like portion. This latter main side portion being of much greater radius of curvature than the bead, it does not have any noticeable tendency to form any observable indentation in the contacting means, and in the usual case of a container which has vertical sides it has no tendency whatsoever to cause an indentation along the vertical direction such as might interfere with the desired free positioning and motioning of the container on the weigh platform.

In a preferred form of the invention, the contacting means comprises a contactor, rotatable about an axis transverse to the train of the cans, which contacts the main side surface of the container just above the bead; preferably this rotatable contactor is in the form of a pair of rollers mounted on lugs extending upwardly from an underlying chain means, and contacting the upstream side surface of the container on opposite sides of a vertical plane extending through the center of the container and along its direction of motion.

Preferably the chain means comprises a pair of chains disposed parallel to each other below the top surface of the weigh platform and provided with opposed pairs of lugs upstanding from the chain and on which the rotatable rollers are mounted.

Since the contactor is preferably rotatable about an axis transverse to the train of cans, it can rotate freely in response to up and down motion of the side of the container against which it bears, thus eliminating restraints on up and down motion of the container which otherwise would occur due to friction between the contactor and the container.

Both the positioning of the contacting means and its rotatability contribute to improved accuracy of weighing, due to the fact that the desired guiding of the can in sliding over the weigh platform is provided while eliminating any support of the can or restraint on the vertical motion of the container due to the contactor, which might otherwise occur due to wear of the contactor over long periods of time.

BRIEF DESCRIPTION OF THE FIGURES

FIG. 1 is an elevational side view of a portion of a system using a preferred embodiment of the invention, and FIG. 2 is a top view corresponding to FIG. 1, both showing a contacting means according to one preferred embodiment of the invention in operative position as it contacts a container while the container is sliding over the top of a weigh platform.

DESCRIPTION OF PREFERRED EMBODIMENTS

Without thereby in any way limiting the scope of the present invention, it will be described with particular reference to its use in the high-speed weighing and conveying apparatus of the above-identified U.S. Pat. No. 4,344,493, the disclosure of which is incorporated herein by reference.

In that patent it will be observed, as shown especially clearly in its FIGS. 8 and 9, that there are disclosed laterally aligned pairs of guiding lugs such as 414, each extending upwardly from each of a pair of parallel chains, the lugs extending upwardly through openings in the top of the weigh platform so as to contact the upstream side of the lower bead of the can at two points on opposite sides of a central vertical plane extending along the direction of motion of the containers. As will be described in more detail hereinafter, the preferred embodiment of the present invention differs from that shown for example in FIGS. 8 and 9 of the latter patent substantially only in that a pair of rotatable rollers are mounted on the two lugs 414, with their axes of rotation transverse to the direction of motion of the cans and with a sufficient radius that the rollers, rather than the lugs, contact the upstream side of the container above the bead.

Referring now specifically to the accompanying figures, there is shown a typical container 10, one of a series of equally spaced-apart similar containers to be weighed as it slides across the top 12 of the weigh platform 14. The container in this example is a product can of a common type having a bead 16 at its bottom end in the form of a circumferential, outwardly-extending flange of small radius of curvature in the vertical plane. The direction of motion of the train of cans is from left to right as shown in the figures. Also shown are upstream and downstream transport rails 17 and 18 on which the cans slide, preferably in response to respective screw conveyors. Can guide rails such as 20,21 are preferably provided on both sides of the train of cans. Also provided are chain guide rails 26 and 28, each of which supports a chain made up of chain links such as 30 and 32. In the interest of clarity the other links of the endless chains are not shown, the details of the preferred arrangement being shown in the above-identified U.S. Pat. No. 4,344,493. The two links shown have upstanding lugs 33 and 34, respectively, secured thereto, as in the system of U.S. Pat. No. 4,344,493.

In accordance with the invention, a pair of roller wheels 40 and 42 are mounted on coaxial axle pins 44 and 45 extending between the pair of opposed lugs, the outer circular edges of the rollers contacting main side body portions of the container 10 just above the bottom bead, as shown.

The individual rollers may for example be made of plastic or metal, and since they will be free to rotate about an axis transverse to the cans, and since they contact the cans on its smooth vertical surface, they will not be subject to the formation of indentations therein due to wear over long periods of usage. Further, as the can moves up and down with the vertically-oscillating weigh platform, the rollers can rotate freely and thus provide friction-free, dragless contact with the can surface. This ensures that the entire weight of the can will be applied to the weigh platform, and that the can will be free to move up and down with the platform as desired for most accurate weighing.

In the described application of the invention the contacting arrangement shown provides substantially more accurate weight indications, thereby permitting more accurate control of the filling of the containers so that substantially no excess product need be introduced, with consequent savings in the amount of product dispensed into the container while meeting the requirement to fill it with the weight of product usually specified on the container.

While the invention has been described with particular reference to specific embodiments in the interest of complete definiteness, it will be understood that it may be embodied in a variety of forms diverse from those specifically shown and described, without departing from the spirit and scope of the invention as defined by the appended claims.

What is claimed is:

1. In a system for slidingly conveying across a vibratory weighing platform a train of containers each to be weighed as it slides across said platform and each having a peripheral flange portion adjacent the bottom thereof extending horizontally outward from at least the upstream side of said container, comprising chain means moving horizontally below the top of said platform, and contacting means mounted on said chain means for contacting the upstream sides of said containers as they move across said platform, the improvement, wherein:

said contacting means comprises a contactor extending upwards from said chain means and adapted to extend around said flange portion without contacting it and into contact with an upstream side portion of said container which is located adjacent but above said flange portion.

2. The improvement of claim 1, wherein said contactor comprises a member rotatable about an axis transverse to said train of containers and positioned to contact said upstream side portion of said container.

3. The improvement of claim 2, wherein said rotatable member comprises a roller freely rotatable about said axis.

4. The improvement of claim 3, wherein said chain means comprises a pair of parallel chains and a pair of said rollers positioned to contact said container on opposite sides of a vertical plane extending through the center of said container and along the direction of motion of the container.

5. The improvement of claim 4, wherein said contactor comprises a lug extending upward from each of said chains, each of said rollers being mounted on one of said lugs.

6. The improvement of claim 5, wherein said container comprises a right cylindrical can and said flange portion comprises a circumferential bead extending around the bottom end of said can.

* * * * *